United States Patent [19]

Lew et al.

[11] Patent Number: 4,561,132
[45] Date of Patent: Dec. 31, 1985

[54] AIR-VAC TOILET

[76] Inventors: Hyok S. Lew, 7890 Oak St., Arvada, Colo. 80005; Michael Stranahan, P.O. Box 15, Woody Creek, Colo. 81656

[21] Appl. No.: 600,151

[22] Filed: Apr. 13, 1984

Related U.S. Application Data

[63] Continuation-in-part of Ser. No. 474,967, Mar. 14, 1983, abandoned.

[51] Int. Cl.⁴ ............................................. E03D 11/00
[52] U.S. Cl. ........................................... 4/420; 4/431; 4/321; 4/DIG. 19; 4/415
[58] Field of Search ............................. 4/111.1–111.6, 4/323, 362, 420, 415, 321, 315, 317, 318, 449, 322, DIG. 19, 431, 426, 434, 407–408, 316

[56] References Cited

U.S. PATENT DOCUMENTS

| | | | |
|---|---|---|---|
| 3,098,144 | 7/1963 | Dale | 4/111.5 X |
| 3,611,447 | 10/1971 | Howard | 4/323 |
| 3,643,265 | 2/1972 | Wiswell, Jr. | 4/323 |
| 3,648,297 | 3/1972 | MacMillan | 4/420 |
| 3,673,614 | 7/1972 | Claunch | 4/111.2 X |
| 3,733,617 | 5/1973 | Bennett | 4/111.1 X |
| 3,748,663 | 7/1973 | Hiller | 4/323 X |
| 3,780,757 | 12/1973 | Jordan | 4/321 X |
| 3,868,731 | 3/1975 | Stahl et al. | 4/111.2 X |
| 4,196,477 | 4/1980 | Stewart | 4/111.6 X |
| 4,199,828 | 4/1980 | Hellers | 4/321 |
| 4,310,934 | 1/1982 | Hennessy et al. | 4/362 |
| 4,357,719 | 11/1982 | Badger et al. | 4/323 X |

Primary Examiner—Henry K. Artis

[57] ABSTRACT

This invention relates to toilet equipment that vacuum or heat-dries human waste and dispenses of the dehydrated human waste in a pulverized solid-form by means of pneumatic transportation.

16 Claims, 6 Drawing Figures

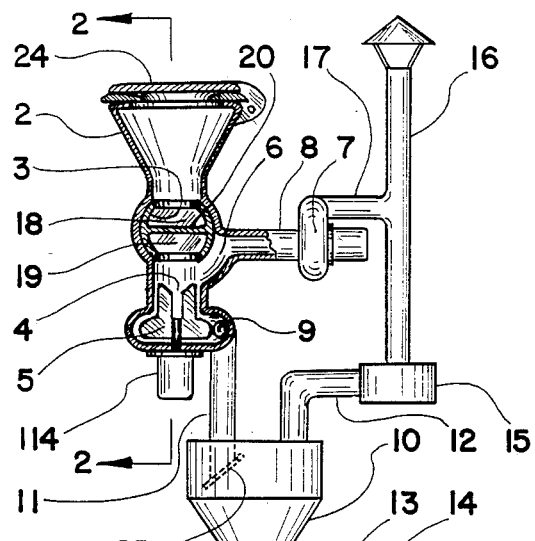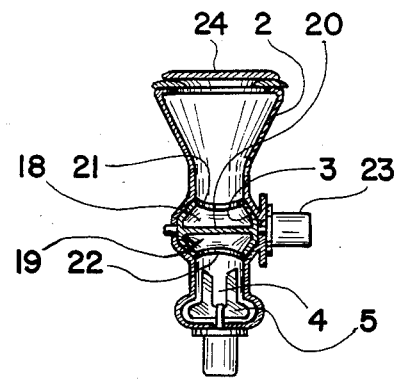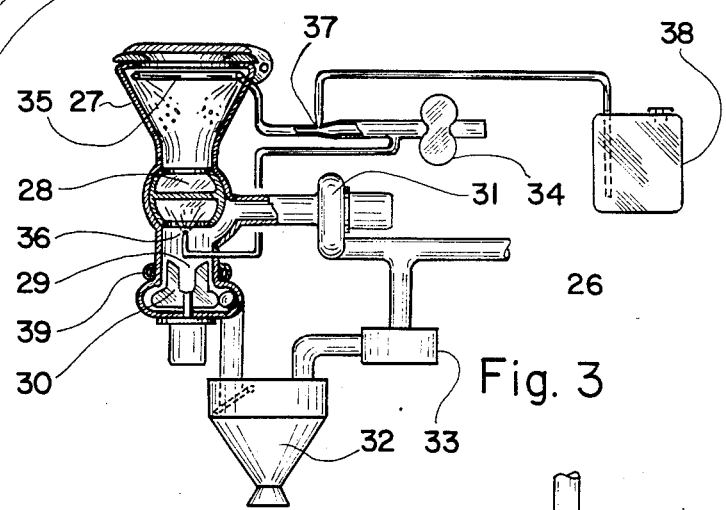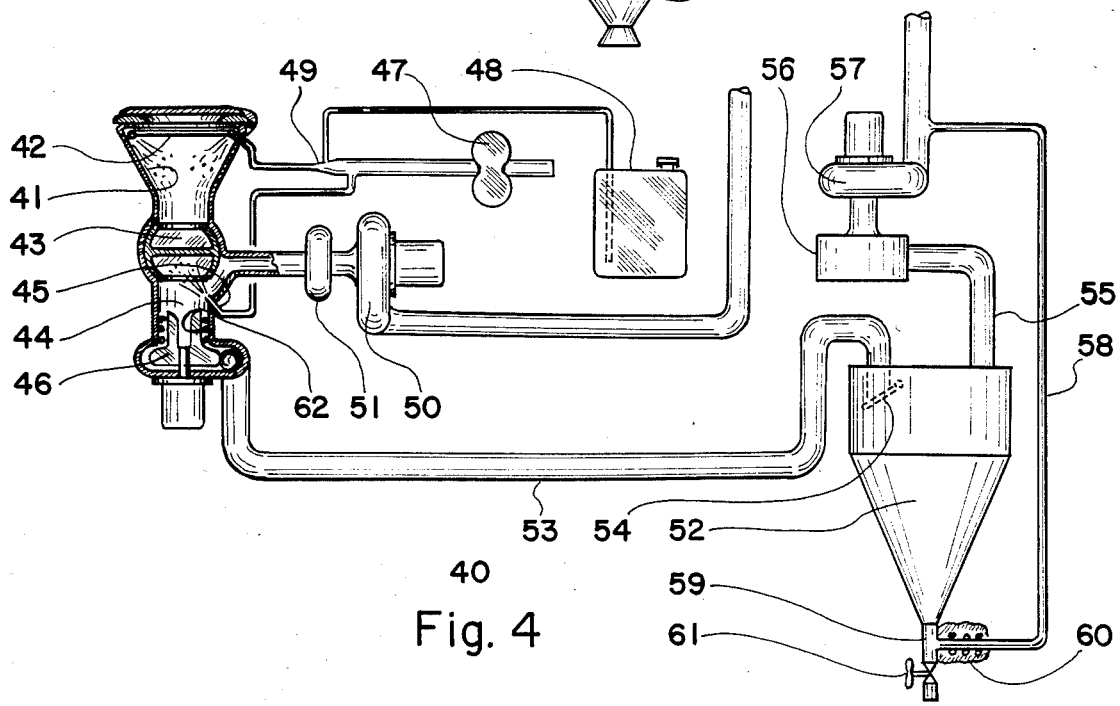
Fig. 1
Fig. 2
Fig. 3
Fig. 4

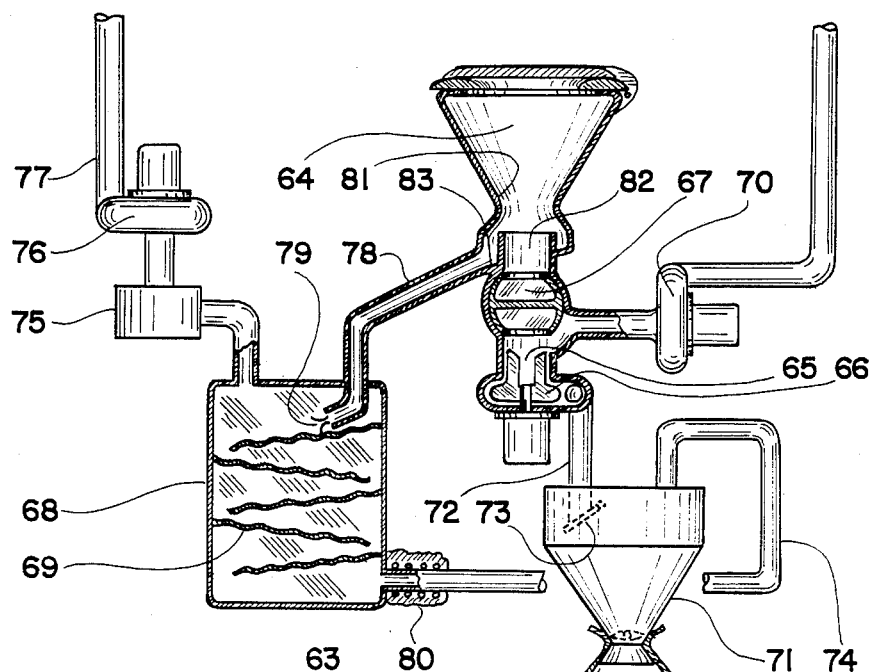
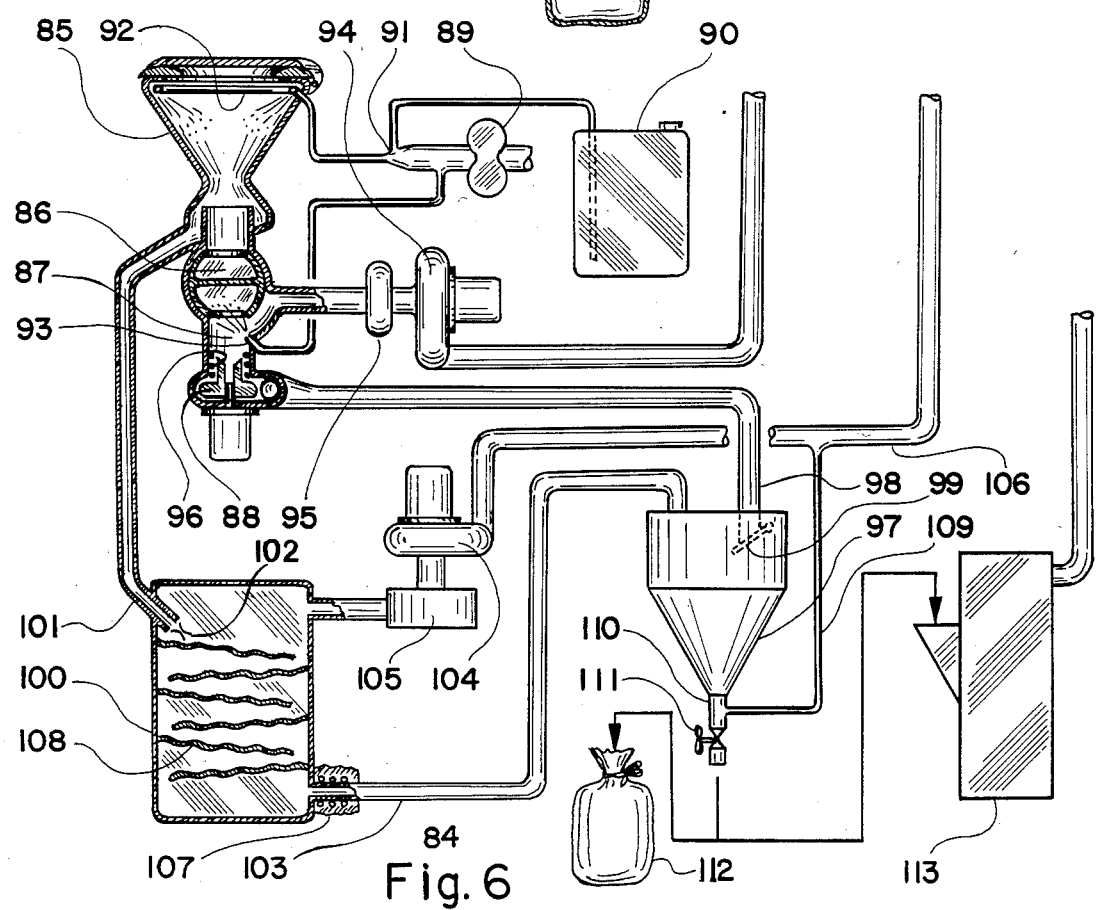

AIR-VAC TOILET

BACKGROUND OF THE INVENTION

One of the most unwise and unintelligent practices adopted by the people in their daily lives is the use of the water-toilet. An average person consumes about forty-five percent of the total amount of water consumed daily to flush out his or her toilet. Indeed, it is plain stupidity to waste such a portion of water of drinkable quality to flush the toilet and, then worry about dwindling water resources and be afraid of contaminating the drinking water. Firstly, it does not make any sense at all to waste forty-five percent of the daily water consumption of each household when the resources of clean and drinkable water have been continuously dwindling. Secondly, it is down-right unwise to mix a small amount of human waste with a large amount of clean water and, then to spend millions of dollars to build a network of sewer pipes and waste water treatment facilities. Thirdly, it is a thoughtless act to dump the waste effluent into the streams and rivers, and then scream about some one polluting and contaminating the sources of our drinking water. As the population of the human race is growing out of bounds and our life-style demands an ever increasing amount of water for use in households and industries, the water is rapidly becoming a valuable commodity. Apart from the economic aspect, people's freedom to choose the residential locality is restricted more often by the availability or unavailability of sewer lines and waste water treatment facilities than the availability of the drinking water.

The major portion of the water problems confronting us today in numerous municipalities can be instantly resolved and eliminated by ridding ourselves of the habit of using the water toilet. The majority of the spoiled brats accustomed to living in an affluent society will not give up the habit of using the water toilet unless a better alternative becomes available. There have been a number of different toilets which do not continuously discharge the diluted human waste with water. The composting toilet as well as the incinerating toilet does not use any water. There are toilets that use mineral oil to flush the waste instead of water wherein the oil is recycled. There is also available the recycling water toilet that recycles the water used to flush the toilet. So far, none of these unconventional toilets has succeeded in replacing the conventional water toilet. The composting toilet lacks the cleanliness of the water toilet and leaves the messy end product of compost, which most city dwellers do not know what to do with. The incinerating toilet consumes a great deal of energy and, consequently, it is economically unacceptable for most households. Furthermore, the present day technology of the incinerating toilet is positively unacceptable in terms of air-pollution control standards and safety standards for installation in household dwellings. Indeed, it is questionable that the use of a large number of incinerating toilets can be allowed in a crowed municipality without creating a very serious air pollution problem. The recycling toilet, whether it uses water or oil to flush the toilet, requires the capital investment and an operating/maintenance expense too high for average households. It is also doubtful that such recycling toilets provide cleanliness and sanitary levels comparable to the conventional water toilet. In conclusion, all of the nonconventional toilets available today are not good enough in the technical point of view and not attractive enough in the consumer's point of view to replace the conventional toilet.

The primary object of the present invention is to provide the air-vac toilet that uses little or no water while still being as clean and attractive as the water toilet.

Another object is to provide an air-vac toilet with air circulation to contain the odor within the toilet bowl.

A further object is to instantly dehydrate excreted human waste by means of vacuum-drying.

Yet another object is to employ a preseparating toilet bowl that roughly separates the liquid waste from the solid waste wherein the liquid waste are evaporated in an evaporator by means of hot air circulation, while the solid waste is instantly dehydrated by means of vacuum-drying.

Yet a further object is to provide an air-vac toilet that uses a small amount of water for rinsing off the toilet bowl wherein the spent rinse water is evaporated in an evaporator.

Still another object is to provide an air-vac toilet wherein the dehydrated solid waste is transported by the earth's gravity.

Still a further object is to provide an air-vac toilet wherein the dehydrated solid waste is transported by means of pneumatic conveying.

These and other objects of the present invention will become clear as the description thereof proceeds.

BRIEF DESCRIPTION OF FIGURES

The present invention may be described with greater clarity and specificity by referring to the following figures:

FIG. 1 illustrates a general arrangement of an air-vac toilet suitable for a mobile installation.

FIG. 2 illustrates a cross section of the toilet bowl employed in the air-vac toilet of FIG. 1.

FIG. 3 illustrates a general arrangement of an air-vac toilet equipped with a compressed air-assisted rinsing system designed for a mobile installation.

FIG. 4 illustrates a general arrangement of an air-vac toilet suitable for a permanent installation.

FIG. 5 illustrates a general arrangement of an air-vac toilet employing a preseparating toilet bowl designed for a mobile installation.

FIG. 6 illustrates a general arrangement of an air-vac toilet employing a preseparating toilet bowl equipped with a compressed air-assisted rinsing system that is designed for a permanent installation.

DESCRIPTION OF THE ILLUSTRATED EMBODIMENTS

In FIG. 1, there is shown a general arrangement of an air-vac toilet including the least number of components, which is suitable for mobile installations such as mobile homes, small boats, construction site restrooms, etc. The economic model 1 of the air-vac toilet designed for a mobile installation includes a toilet bowl 2 equipped with a rotary air-lock valve 3, which rotary air-lock valve discharges the human waste into a dehydration-evaporation chamber equipped with a dehydrated solid waste disposer 5. The dehydration-evaporation chamber 4 includes an air outlet 6 connected to a vacuum blower or vacuum pump 7 by a duct 8 and a dehydrated waste outlet 9 connected to a waste hopper 10 by a vertical discharge tube 11. The waste hopper has an exhaust duct 12 disposed upwardly therefrom and a waste discharge gate 13 to which a plastic bag 14 is tied. The exhaust duct 12 is connected to a dust filter 15 with an exhaust stack 16 to which the exhaust duct 17 from the vacuum blower or vacuum pump 7 is connected. It should be understood that the air outlet 6 of the dehydration-evaporation chamber 4 is disposed at a high point thereof, while the dehydrated wastes outlet 9 is disposed at a low point thereof at a level somewhat higher than the bottom of the dehydration-evaporation chamber. The rotary air-lock valve 3 is divided into a pair of compartments 18 and 19 with openings by a partitioning wall 20. The waste disposer 5 is a mechanical pulverizer with centrifugal blower that breaks down the dehydrated waste into particles and blows out the pulverized dehydrated waste through the waste outlet 9. The waste disposer 5 may be of a vane-type or a ball-mill type mechanical pulverizer equipped with a centrifugal blower or combination of two types. The discharge tube 11 is equipped with a swing check valve 25 which allows the pulverized dehydrated waste to enter the waste hopper 10 and check the air in the waste hopper 10 from entering the dehydration-evaporation chamber 4.

In FIG. 2, there is illustrated a cross section of the assembly comprising the toilet bowl 2, the rotary air-lock valve 3 and the dehydration-evaporation chamber 4 as included in the air-vac toilet shown in FIG. 1, which cross section is taken along a plane 2—2 as shown in FIG. 1. The rotary air-lock valve 3 is a hollow circular cylindrical or spherical container divided into a pair of compartments 18 and 19 by a partitioning wall 20, wherein the compartments 18 and 19 has openings 21 and 22 through the cylindrical wall. The rotary air-lock valve 3 is operated by an electric motor or other form of power drive 23.

The air-vac toilet 1 of the economic design as described in conjunction with FIGS. 1 and 2 operates in the following principles: When a person lifts up the bowl cover 24 to use the air-vac toilet 1, the vacuum blower 7 becomes switched on and, consequently, the air surrounding the toilet bowl 2 is continuously sucked into the bowl and exhausted through the exhaust stack 16. This movement of the air prevents the odor from escaping out of the toilet bowl and into the surrounding space. Of course, the vacuum blower switch may be coupled to the bathroom light switch instead of the lifting action of the bowl cover. It should be understood that a bathroom equipped with an air-vac toilet does not require an exhaust fan because the vacuum blower 7 of the air-vac toilet functions as an exhaust fan. The air flow from the toilet bowl 2 to the vacuum blower 7 may take place through gaps in the rotary air-lock valve 3. For this reason, the air-lock valve 3 should not and need not be one hundred percent air-tight. Upon finishing use of the toilet, the user lowers the bowl cover 24, which action activates the rotary air-lock valve motor 23 that rotates the rotary air-lock valve 3 over one hundred eighty degrees whereupon the empty compartment of the air-lock valve 3 is lined up with the toilet bowl bottom and the filled compartment is lined up with the top of the dehydration-evaporation chamber 4. The waste are emptied from the lower compartment of the air-lock valve 3 to the dehydration-evaporation chamber 4 by the pull of the earth's gravity. The waste dumped into the dehydration-evaporation chamber 4, are dehydrated and evaporated by vacuum drying that is enhanced by the closed toilet bowl cover 24 and the swing check valve 25 included in the discharge end of the waste discharge tube 11, as the vacuum blower 7 continues to run. When the liquid waste are completely evaporated and the solid waste is completely dehydrated, the vacuum blower 7 is turned off and the wastes disposer motor 114 is turned on, whereby control sequence may be programmed by using a timer or controlled by a moisture sensor. The waste disposer 5 pulverizes the dehydrated solid waste and pneumatically conveys the pulverized solid waste into the waste hopper 10 that empties into a plastic bag 14 through discharge gate 13. The air in the waste hopper 10 is vented to the atmosphere through a filter 15 which may include a deordorizing function in addition to the filtering function. The waste disposer motor stops after operating for a predetermined period, which completes one cycle of operation of the air-vac toilet 1. It should be understood that the top compartment of the rotary air-lock valve 3 may be filled with the waste from another user, while the waste from the first user is being dehydrated and evaporated in the dehydration-evaporation chamber 4. It should be understood that the air-vac toilet 1 may be operated without the waste disposer 5 being driven by the disposer motor when a water-tight gate is installed at the bottom of the dehydration-evaporation chamber wherein the dehydrated waste drops straight down into plastic bags without being pulverized upon opening of the water-tight gate.

In FIG. 3 there is illustrated a general arrangement of a deluxe model of the air-vac toilet 26 comprising a compressed air-assisted rinsing system in addition to the toilet bowl 27, the rotary air-lock valve 28, the dehydration-evaporation chamber 29 with the waste disposer 30, the vacuum blower or pump 31, the waste hopper 32 and filter-deodorizer 33 having the same construction and functions and interconnected in the same way as those components included in the air-vac toilet 1 shown in FIG. 1. The compressed air-assisted rinsing system comprises an air compressor 34 supplying the compressed air to the rinsing spray ring 35 including a plurality of spraying holes and to a compressed air nozzle 36. An eductor 37 is included wherein the compressed air supplied to the rinsing spray ring 35 siphones the rinse water from the rinse water tank 38. The mixture of the water from the rinse water tank 38 and the compressed air from the air compressor 34 is sprayed onto the inside wall of the toilet bowl 27 at a high velocity through the spray holes included in the rinsing spray ring 35 disposed around the opening of the toilet bowl 27. The high speed jet of compressed air emerging from the compressed air nozzle 36 is directed into the lower compartment of the rotary air-lock valve 28 and blow-cleans the wall of the compartment of the rotary air-lock valve 28 rotated to the lower position. The compressed air-assisted rinsing system is activated by the lowering action of the toilet bowl cover that switches on the air compressor 34 for an operation of a predetermined duration significantly shorter than the duration of operation of the vacuum blower 31. As the high velocity of mixture of compressed air and water enhances the spray cleaning of the toilet bowl by the rinsing sprays from the rinsing spray ring 35, only a small amount of rinse water is required to clean the toilet bowl after each use. The operating sequence of the air-vac toilet shown in FIG. 3 is the same as that described in conjunction with FIG. 1. The heat exchanger 39 is disposed around the dehydration-evaporation chamber 29 to enhance the vacuum-drying of the waste dumped into the dehydration-evaporation chamber. For an air-vac toilet installed in a mobile home, the exhaust gas from the engine circulated through the heat exchanger 39 may be used to heat the dehydration-evaporation chamber 29.

In FIG. 4, there is shown a general arrangement of an air-vac toilet designed for a permanent installation in residential and office buildings. The air-vac toilet 40 comprises essentially the same elements, e.g., the toilet bowl 41 equipped with a rinsing spray ring 42, the rotary air-lock valve 43, the dehydration-evaporation chamber 44 equipped with a compressed air nozzle 45 and a waste disposer 46, the air compressor 47, the rinse water tank 48 supplying water t the eductor 49 and the vacuum blower 50 wherein those elements are constructed and arranged in the same manner as the elements included in the air-vac toilet 26 illustrated in FIG. 3. The air-vac toilet 40 of FIG. 4 differs from the air-vac toilet 26 of FIG. 3 in that the vacuum blower 50 has an intake filter-deodorizer 51. The air-vac toilet 40 includes an oxidizing waste hopper 52 that receives the pulverized and dehydrated solid waste conveyed from the dehydration-evaporation chamber 44 by means of the pneumatic conveying through the waste discharge tube 53 equipped with a swing check valve 54. The air employed in the pneumatic conveying is removed from the oxidizing waste hopper 52 through the exhaust stack 55 equipped with a filter-deodorizer 56 and a suction blower 57. An air recirculation duct 58 connects the outlet of the suction blower 57 to the bottom 59 of the oxidizing waste hopper 52, which enables it to aerate the pulverized dehydrated solid waste stored in the oxidizing waste hopper 52 by percolating the air supplied through the recirculation duct 58 therethrough wherein the recirculated air may be preheated by a heating coil or heat exchanger or other heating means 60 heating the recirculated air. The remaining solid waste in the oxidizing waste hopper 52 is emptied into a plastic bag through a hopper gate equipped with a valve 61. A heating coil or heat exchanger or other heating means 62 installed in the dehydration-evaporation chamber 44 may be used to enhance the vacuum drying of the solid waste in the dehydration-evaporation chamber 44. The suction blower 57 should have the same control as that of the waste disposer 46; whereby, the pneumatic conveying of the pulverized dehydrated solid waste from the dehydration-evaporation chamber 44 to the oxidizing waste hopper 52 is realized by both the centrifugal vane of the waste disposer 46 and the suction blower 57. The principle and the mode of operation of the air-vac toilet 40 are the same as that described in conjunction with FIG. 1.

In FIG. 5, there is illustrated a general arrangement of an air-vac toilet 63 employing a preseparating toilet bowl 64 that discharges the solid waste to the dehydration-evaporation chamber 65 equipped with a waste disposer 66 through a rotary air-lock valve 67, while the liquid waste is roughly separated from the solid waste in the preseparating toilet bowl 64 and emptied into a multiple tray evaporator 68 including a plurality of stacked trays 69. The solid waste dumped to the dehydration-evaporation chamber 65 is vacuum-dried by the vacuum blower or vacuum pump 70 and the dehydrated solid waste is pulverized and pneumatically conveyed into a waste hopper 71 through the waste discharge tube 72 equipped with a swing check valve 73 by the wastes disposer 66 with centrifugal vanes. The air used in the pneumatic conveying of the pulverized dehydrated solid waste is vented from the waste hopper 71 into the liquid waste evaporator 68 through the venting air duct 74 connecting the top of the waste hopper 71 to the bottom of the evaporator 68. The liquid waste evaporator is equipped with a filter deodorizer 75 and a suction blower 76 that discharges the air vented from the waste hopper 71 and circulated through the liquid waste evaporator 68 into the atmosphere through the exhaust stack 77. The liquid waste separated from the solid waste in the preseparating toilet bowl 64 flows into the liquid waste evaporator 68 by the gravity through the liquid waste discharge pipe 78 equipped with an orifice 79 and trickles down through the plurality of the trays 69 in a counter current movement against the currents of hot air circulated through the plurality of the trays by the suction blower 76 which counter current flow arrangement enhances the evaporation of the liquid waste trickling down over the plurality of the trays with large wettable surface areas by the convective heat and mass transfer of the circulating air heated by the heating coil or heat exchanger or other heating means 80. The orifice 79 is included to check the amount of the air entering the liquid waste evaporator from the preseparating toilet bowl 64 while allowing a sufficient flow rate of the liquid waste from the preseparating toilet bowl 64 into the evaporator 68. It should be understood that a rinsing spray ring equivalent to the item 42 of FIG. 4 may be included in the preseparating toilet bowl 64 wherein the rinsing spray water is separated from the solid waste and emptied into the liquid waste evaporator 68 through the liquid waste discharge pipe 78. The control of the suction blower 76 should be tied to the control of the vacuum blower 70 with an overriding control circuit controlled by the moisture detector installed in the liquid waste evaporator 68. The air-vac toilet 63 equipped with a preseparating toilet bowl 64 may be operated in the same principles and modes as the air-vac toilet of FIG. 1. The air-vac toilet with a preseparating toilet bowl is more energy efficient compared with the air-vac toilet with a nonseparating toilet bowl. It should be understood that direct heating by sun light may be employed to heat the air and/or the liquid waste currents in the evaporator 68.

The preseparating toilet bowl 64 employed in the air-vac toilet of FIG. 5 includes a converging-diverging bowl shell 81 wherein the inlet tube 82 of the rotary air-lock valve 67 having a diameter comparable to the diameter of the throat section of the converging-diverging shell 81 is disposed coaxially at the diverging section of the converging-diverging shell 81; whereby providing an annular opening between the diverging portion of the converging-diverging shell 81 and the inlet tube 82 of the rotary air-lock valve 67. The bottom 83 of the annular compartment intermediate the converging-diverging shell 81 and the inlet tube 82 of the rotary air-lock valve 67 is sloped to enhance the emptying of the liquid waste through the liquid waste discharge pipe 78. The liquid waste and/or rinse water sprayed onto the wall of the toilet bowl flows adhering to the inside surface of the converging-diverging shell 81 due to the effect of surface tension, and then collects into the bottom of the annular zone intermediate the converging-diverging shell 81 and the inlet tube 82 of the rotary air-lock valve 67, while the solid waste drops straight down into the inlet tube 82 of the rotary air-lock valve 67. In using the air-vac toilet equipped with a preseparating toilet bowl, it is recommended that male users set down and relieve their bladder so that the liquid waste lands on the toilet bowl wall and empties into the liquid waste evaporator. Such a practice is also desirable in view of the fact that the liquid waste does not splash out of the toilet bowl and create a mess as often occurs in the conventional practice of relieving themselves in the standup position. Of course, the air-vac toilet equipped with a preseparating toilet bowl works perfectly well even when a male user empties himself in the stand-up position wherein there will be a greater amount of energy consumption by the vacuum blower 70 to vacuum evaporate the liquid waste dumped into the dehydration-evaporation chamber 65, as the liquid waste evaporator 68 is a far more efficient liquid evaporator than the dehydration-evaporation chamber 65. It should be understood that spongy materials or packing of solid particles providing a large amount of wetted surface areas may be used instead of the multiple tray arrangement in the liquid waste evaporator as shown in FIG. 5.

In FIG. 6, there is shown a general arrangement of an air-vac toilet 84 that is a delux energy efficient model suitable for installation in private dwellings as well as large office and business buildings wherein an air-vac toilet capable of handling a heavy load is required. The energy efficient heavy duty air-vac toilet 84 comprises the combination including the preseparating toilet bowl 85, the rotary air-lock valve 86 and the dehydration-evaporation chamber 87 equipped with a solid waste disposer 88 constructed and assembled in the same manner as the corresponding combination included in the air-vac toilet 63 in FIG. 5, which combination further includes a compressed air-assisted rinsing system comprising the air compressor 89, the rinse water tank 90, the eductor 91, the rinsing spray ring 92 and the compressed air nozzle 93. The operating principles and sequence of the compressed air-assisted rinsing system are the same as those described in conjunction with the air-vac toilet 26 of FIG. 3. The vacuum blower or vacuum pump 94 equipped with an intake filter-deodorizer 95 creates a partial vacuum in the dehydration-evaporation chamber 87 and vacuum dries the solid waste dumped thereto wherein the heating coil 96 may be employed to enhance the vacuum drying process by heating the solid waste. The dehydrated solid waste is pulverized by the waste disposer 88 and pneumatically conveyed into the oxidizing waste hopper 97. The waste discharge tube 98 conveying the pulverized dehydrated solid waste from the dehydration-evaporation chamber 87 to the oxidizing waste hopper 97 includes a swing check valve 99 that prevents the air flow from the oxidizing waste hopper 97 to the dehydration-evaporation chamber 87 during the vacuum drying cycle. The liquid waste separated from the solid waste in the preseparating toilet bowl 85 empties into the liquid waste evaporator 100 through the liquid waste discharge pipe 101 equipped with an orifice 102. The air vent duct 103 originating from the top of the oxidizing waste hopper 97 is connected to the bottom of the liquid waste evaporator 100. The suction blower 104 equipped with a filter-deodorizer 105 draws the air from the liquid waste evaporator 100 and exhaust to the atmosphere through the exhaust stack; whereby, creating a hot air current heated by the heating coil or other heating means 107 that flows counter current fashion to the liquid waste trickling over a series of the trays 108 included in the liquid waste evaporator 100. The recirculation air duct 109 directs a portion of the air exhausted from the suction blower 104 to the bottom 110 of the oxidizing waste hopper 97 wherein the recirculating air precolates through the pulverized solid wastes stored in the oxidizing waste hopper 97 and enhances the oxidation thereof. The oxidized solid waste in the oxidizing waste hopper 97 is taken out through the hopper gate equipped with a valve 111 and bagged in a plastic bag 112 or dumped into an incinerator 113 for incineration. The suction blower 104 should be controlled by a controller tied to the control of the vacuum blower 94 with an over-ride-switch controlled by the moisture sensor sensing the moisture content in the liquid waste evaporator 100. The operating principles and sequences of the air-vac toilet 84 are the same as those described in conjunction with those air-vac toilets shown in FIGS. 4 and 5.

It is interesting to notice that the waste discharged from the kitchen sinks equipped with a garbage disposer creates a dilemma for the households that have no sewer connections to their dwellings. It is an obvious extension of the principles of the present invention to make or fabricate the air-vac garbage disposer with either a preseparating sink similar to the preseparating toilet bowl or a nonseparating sink similar to the non-separating toilet bowl, wherein the waste from the kitchen sink is dehydrated and evaporated.

While the principles of the present invention have now been made clear by the illustrative embodiments, the utilization of the present invention shall not be limited to such illustrative embodiments as will be immediately obvious to the skilled in the art which may make modifications of the structure, arrangements, elements, proportions and materials which are particularly adapted to the specific working environment and the operating condition in practicing the invention, without departing from the principles of the present invention.

We claim:

1. An air-vac toilet system comprising in combination:
    (a) a toilet bowl of a funnel-shaped tubular construction including a seat disposed at the diverging end and further including a converging bottom;
    (b) an air-lock valve with the inlet connected to said converging bottom of said toilet bowl;
    (c) a dehydration-evaporation chamber connected to the outlet of said air-lock valve;
    (d) means for creating an evacuated state in said dehydration-evaporation chamber wherein waste transferred across said air-lock valve from said toilet bowl to said dehydration-evaporation chamber is vacuum dried and evaporated by said means for creating an evacuated state;
    (e) means for conveying the dehydrated solid waste out of said dehydration-evaporation chamber; and
    (f) means for storing and disposing of the dehydrated solid waste discharged from said dehydration-evaporation chamber by said means for conveying.

2. The combination as set forth in claim 1 wherein said combination includes a compressed air-assisted rinsing system comprising in combination: means for supplying compressed air; means for supplying rinse water and mixing said rinse water with the compressed air provided by said means for supplying compressed air; and at least one spray nozzle for cleaning the inside surface of said toilet bowl by spraying the mixture of said rinse water and said compressed air.

3. The combination as set forth in claim 2 wherein said combination comprises at least one compressed air nozzle included in said dehydration-evaporation chamber for blow-cleaning said air-lock valve by directing a jet of compressed air to said air-lock valve.

4. The combination as set forth in claim 2 wherein said combination includes at least one spray nozzle included in said dehydration-evaporation chamber for spray-cleaning said air-lock valve by directing a jet of mixture of said rinse water and said compressed air.

5. The combination as set forth in claim 1 wherein said combination includes a heating means for heating said dehydration-evaporation chamber wherein waste is dehydrated and evaporated by heat-assisted vacuum drying.

6. The combination as set forth in claim 1 wherein said means for storing and disposing of the dehydrated solid waste includes an oxidizing waste hopper equipped with means for aerating the dehydrated solid waste stored in said oxidizing waste hopper.

7. The combination as set forth in claim 2 wherein said means for storing and disposing of the dehydrated solid waste includes an oxidizing waste hopper equipped with means for aerating the dehydrated solid waste stored in said oxidizing waste hopper.

8. The combination as set forth in claim 5 wherein said means for storing and disposing of the dehydrated solid waste includes an oxidizing waste hopper equipped with means for aerating the dehydrated solid waste stored in said oxidizing waste hopper.

9. An air-vac toilet system comprising in combination:
(a) a preseparating toilet bowl of a funnel-shaped tubular construction including a seat disposed at the diverging end and further including a converging-diverging tubular bottom having a smooth throat section wherein said preseparating toilet bowl is provided with a diverging bottom;
(b) an air-lock valve with an inlet tube of diameter substantially greater than the diameter of the throat section of said converging-diverging tubular bottom of said preseparating toilet and substantially less than the diameter of said diverging bottom of said preseparating toilet bowl wherein said inlet tube of said air-lock valve is disposed within the diverging portion of said converging-diverging tubular bottom of said preseparating toilet bowl in a substantially coaxial relationship providing an annular compartment with an open top and closed bottom intermediate the diverging portion of said converging-diverging tubular bottom of said preseparating toilet and said inlet tube of said air-lock valve; whereby the liquid waste and rinse water landing on the wall of said preseparating toilet bowl flows down following the wall of said convering-diverging tubular bottom of said preseparating toilet bowl due to the surface tension of the liquid and enters into said annular compartment while the solid waste funneled to the throat of said con-converging-diverging tubular bottom of said preseparating toilet bowl drops into said inlet tube of said air-lock valve;
(c) a dehydration-evaporation chamber connected to the outlet of said air-lock valve;
(d) means for creating an evacuated state in said dehydration-evaporation chamber wherein waste transferred across said air-lock valve from said toilet bowl to said dehydration-evaporation chamber is vacuum dried and evaporated by said means for creating an evacuated state;
(e) means for conveying the dehydrated solid waste out of said dehydration-evaporation chamber; and
(f) means for storing and disposing of the dehydrated solid waste discharged from said dehydration-evaporation chamber by said means for conveying; and
(g) a liquid waste evaporator connected to said annular compartment collecting the liquid waste and rinse water, said liquid waste evaporator including means for spreading the liquid waste and rinse water discharged into said liquid waste evaporator over a large surface area and further including means for circulating air through said liquid waste evaporator; whereby said liquid waste and rinse water evaporates into the atmosphere in an accelerated phase due to a large wetted area exposed to air circulation by said means.

10. The combination as set forth in claim 9 wherein said combination includes a compressed air-assisted rinsing system comprising in combination: means for supplying compressed air; means for supplying rinse water and mixing said rinse water with the compressed air provided by said means for supplying compressed air; and at least one spray nozzle for cleaning the inside surface of said toilet bowl by spraying the mixture of said rinse water and said compressed air.

11. The combination as set forth in claim 10 wherein said combination comprises at least one compressed air nozzle included in said dehydration-evaporation chamber for blow-cleaning said air-lock valve by directing a jet of compressed air to said air-lock valve.

12. The combination as set forth in claim 10 wherein said combination includes at least one spray nozzle included in said dehydration-evaporation chamber for spray-cleaning said air-lock valve by directing a jet of mixture of said rinse water and said compressed air.

13. The combination as set forth in claim 9 wherein said combination includes a heating means for heating said dehydration-evaporation chamber wherein waste is dehydrated and evaporated by heat-assisted vacuum drying.

14. The combination as set forth in claim 9 wherein said means for storing and disposing of the dehydrated solid waste includes an oxidizing waste hopper equipped with means for aerating the dehydrated solid waste stored in said oxidizing waste hopper.

15. The combination as set forth in claim 10 wherein said means for storing and disposing of the dehydrated solid waste includes an oxidizing waste hopper equipped with means for aerating the dehydrated solid waste stored in said oxidizing waste hopper.

16. The combination as set forth in claim 13 wherein said means for storing and disposing of the dehydrated solid waste includes an oxidizing waste hopper equipped with means for aerating the dehydrated solid waste stored in said oxidizing waste hopper.

* * * * *